US009751385B2

(12) United States Patent
Yano et al.

(10) Patent No.: US 9,751,385 B2
(45) Date of Patent: Sep. 5, 2017

(54) ELECTROSTATIC ATOMIZATION SYSTEM FOR VEHICLE

(75) Inventors: Takeshi Yano, Kyoto (JP); Akihide Sugawa, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 41 days.

(21) Appl. No.: 13/820,004

(22) PCT Filed: Sep. 6, 2011

(86) PCT No.: PCT/JP2011/070252
§ 371 (c)(1),
(2), (4) Date: Feb. 28, 2013

(87) PCT Pub. No.: WO2012/039278
PCT Pub. Date: Mar. 29, 2012

(65) Prior Publication Data

US 2013/0161423 A1 Jun. 27, 2013

(30) Foreign Application Priority Data

Sep. 24, 2010 (JP) ................................ 2010-213518

(51) Int. Cl.
*B05B 5/00* (2006.01)
*B60H 3/00* (2006.01)
(Continued)

(52) U.S. Cl.
CPC ........... *B60H 3/0071* (2013.01); *B05B 5/025* (2013.01); *B05B 5/0255* (2013.01); *B05B 5/057* (2013.01)

(58) Field of Classification Search
CPC ...................................................... B05B 5/057
See application file for complete search history.

(56) References Cited

U.S. PATENT DOCUMENTS 7,959,717 B2 * 6/2011 Yano et al. ........................ 96/27
8,002,904 B2 * 8/2011 Ragozzino .............. B08B 9/032
134/166 R
(Continued)

FOREIGN PATENT DOCUMENTS

CN 101226032 A 7/2008
EP 2119583 A1 11/2009
(Continued)

OTHER PUBLICATIONS

International Preliminary Report on Patentability issued in PCT/JP2011/070252 with date of issuance Apr. 16, 2013.
(Continued)

*Primary Examiner* — Arthur O Hall
*Assistant Examiner* — Adam J Rogers
(74) *Attorney, Agent, or Firm* — McDermott Will & Emery LLP

(57) ABSTRACT

An electrostatic atomization system for a vehicle includes an electrostatic atomization device that generates and emits charged micro-particle water from an emission port, a vehicle interior introduction port arranged in an instrument panel in a vehicle interior, and a communication duct that connects the emission port and the vehicle interior introduction port to emit the charged micro-particle water from the vehicle interior introduction port to the vehicle interior. The communication duct includes a first curved portion, which is arranged between the emission port and the vehicle interior introduction port and curved downward in a lower position than the vehicle interior introduction port, and a second curved portion, which is arranged between the first curved portion and the emission port and curved upward in an upper position than the first curved portion.

6 Claims, 3 Drawing Sheets

(51) Int. Cl.
*B05B 5/025* (2006.01)
*B05B 5/057* (2006.01)

(56) References Cited

U.S. PATENT DOCUMENTS

2006/0201500 A1* 9/2006 Von Hollen ...... A61M 15/0085 128/200.14
2010/0133366 A1 6/2010 Yano et al.
2010/0323602 A1 12/2010 Suematsu et al.
2011/0259980 A1* 10/2011 Akisada ............... B60H 3/0078 239/690

FOREIGN PATENT DOCUMENTS

JP 2007-163109 A 6/2007
JP 2008-087636 A 4/2008
JP 2008-087665 A 4/2008
JP 2008-207632 A 9/2008
JP 2008-238906 A 10/2008
JP 2009-190541 A 8/2009
JP 2010-173636 A 8/2010
WO WO 2007069577 A1 * 6/2007
WO WO 2008050878 A1 * 5/2008
WO WO 2008065737 A1 * 6/2008

OTHER PUBLICATIONS

Chinese Office Action issued in corresponding Chinese Application No. 201180042184.2, dated Sep. 11, 2014.
International Search Report mailed Dec. 13, 2011 issued in corresponding International Application No. PCT/JP2011/070252.

* cited by examiner

ELECTROSTATIC ATOMIZATION SYSTEM FOR VEHICLE

RELATED APPLICATIONS

This application is the U.S. National Phase under 35 U.S.C. §371 of International Application No. PCT/JP2011/070252, filed on Sep. 6, 2011, which in turn claims the benefit of Japanese Application No. 2010-213518, filed on Sep. 24, 2010, the disclosures of which Applications are incorporated by reference herein.

TECHNICAL FIELD

The present invention relates to an electrostatic atomization system for a vehicle.

BACKGROUND ART

An electrostatic atomization device has been mounted on a vehicle in order to remove odor absorbed in a seat and suppress allergenic substances brought into the vehicle interior by a person getting on/off the vehicle (for example, Patent Document 1). The electrostatic atomization device is connected to an air conditioning duct and emits charged micro-particle water generated in a nanometer size to the vehicle interior via the air conditioning duct. Charged micro-particle water emitted into the vehicle interior removes the odor absorbed in the seat and suppresses allergenic substances brought into the vehicle interior by a person getting on/off the vehicle.

When charged micro-particle water is combined with the air blown from an air conditioner, the concentration of the charged micro-particle water is diluted.

Accordingly, a vehicle interior introduction port is formed in an instrument panel and connected to the electrostatic atomization device via a communication duct. In this structure, charged micro-particle water released from the electrostatic atomization device is emitted into the vehicle interior directly through the vehicle interior introduction port arranged in the instrument panel without passing through the air conditioning duct. Thus, the charged micro-particle water is emitted into the vehicle interior without diluting the concentration thereof. Therefore, deodorization and effects of suppressing allergenic substances are not impaired.

Patent Document 1: Japanese Laid-Open Patent Publication No. 2010-173636

SUMMARY OF THE INVENTION

Due to layout restriction in the vehicle, the electrostatic atomization device may have to be arranged in a lower position than the vehicle interior introduction port arranged in the instrument panel in order to emit charged micro-particle water into the vehicle interior.

In such cases, if drinking water enters by some chance from the vehicle interior introduction port arranged in the instrument panel, the drinking water flows into the electrostatic atomization device through the communication duct. This may damage the electrostatic atomization device.

Even if the electrostatic atomization device is arranged in an upper position than an emission port thereof, the electrostatic atomization device may be located lower than the emission port when the vehicle travels on a slope. In this case, drinking water may also flow into the electrostatic atomization device and damage it.

Accordingly, it is an object of the present invention to provide an electrostatic atomization system for a vehicle capable of preventing a liquid such as drinking water which entered from a vehicle interior introduction port from entering the electrostatic atomization device.

One aspect of the present invention is an electrostatic atomization system for a vehicle. The electrostatic atomization system includes an electrostatic atomization device that generates charged micro-particle water by applying a high voltage to a liquid supplied to a discharge unit. The electrostatic atomization device includes an emission port for emitting the charged micro-particle water. The electrostatic atomization system further includes a vehicle interior introduction port arranged in an instrument panel in a vehicle interior. The vehicle interior introduction port is partitioned from an air flow path of an air conditioner and an air outlet of the air conditioner. The electrostatic atomization system further includes a communication duct that connects the emission port and the vehicle interior introduction port to emit the charged micro-particle water generated by the electrostatic atomization device from the vehicle interior introduction port to the vehicle interior. The communication duct includes a first curved portion that is arranged between the emission port and the vehicle interior introduction port. The first curved portion is curved downward in a lower position than the vehicle introduction port. The communication duct further includes a second curved portion that is arranged between the first curved portion and the emission port. The second curved portion is curved upward in an upper position than the first curved portion. According to this structure, even if a liquid, such as drinking water, enters the vehicle interior introduction port which emits the charged micro-particle water, a backflow of the liquid to the electrostatic atomization device is suppressed by the first curved portion and the second curved portion.

EMBODIMENTS OF THE INVENTION

One embodiment of an electrostatic atomization system for a vehicle will now be described with reference to the drawings.

Figure 1:
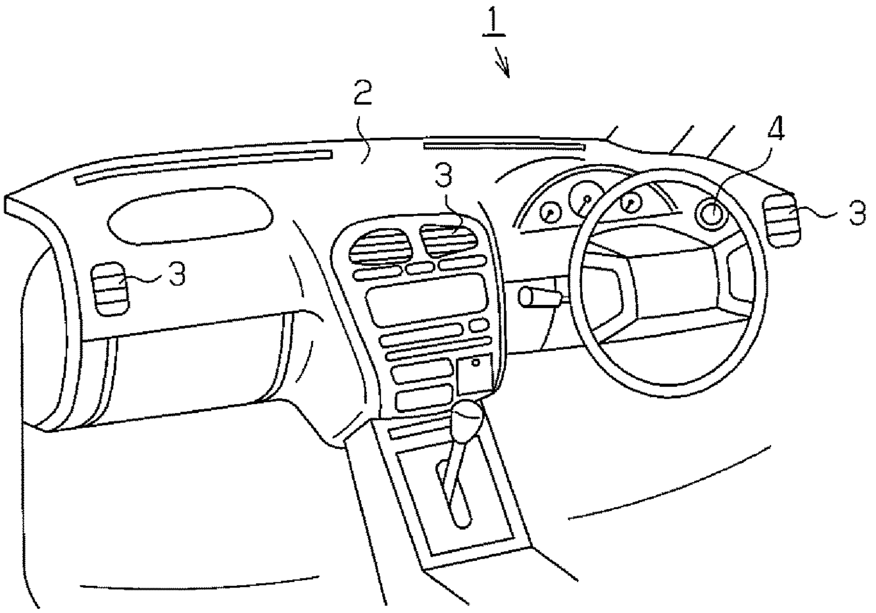
FIG. 1 is a view illustrating a vehicle interior equipped with an electrostatic atomization system for a vehicle.

FIG. 1 illustrates an interior of a vehicle when seen from the rear seat to the front. Air outlets 3 are formed in the center position and both right and left side positions of an instrument panel 2 arranged in a front side of a vehicle interior 1. Each of the air outlets 3 is connected to an air conditioner not illustrated via an air flow path not illustrated which is piped to the instrument panel 2. The air blown from the air conditioner is emitted from each of the air outlets 3 into the vehicle interior 1 via the air flow path.

Figure 2:
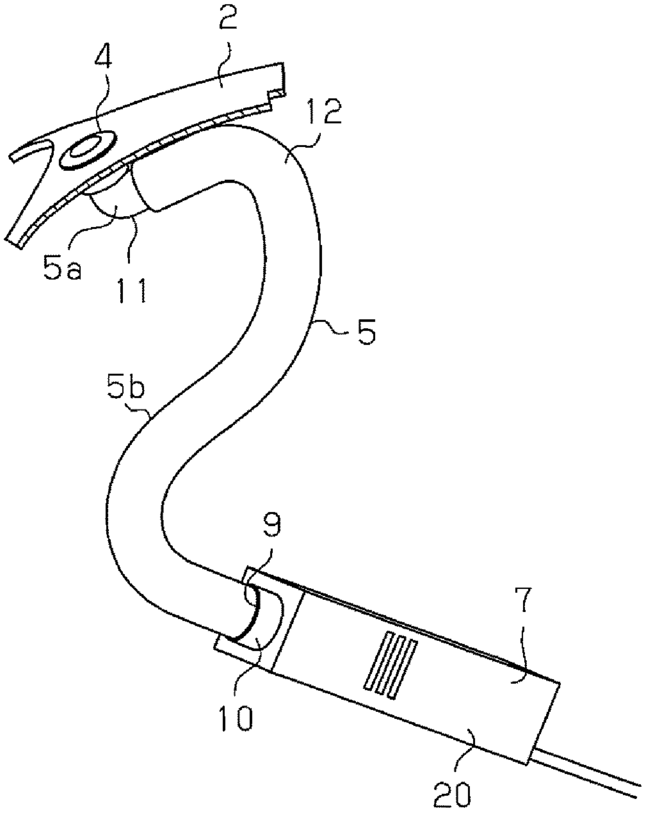
FIG. 2 is a system configuration diagram illustrating the electrostatic atomization system.

A vehicle interior introduction port 4 is formed in a position adjacent to the air outlet 3 arranged on the driver seat side in the instrument panel 2. As illustrated in FIG. 2, the vehicle interior introduction port 4 is connected to an electrostatic atomization device 7, which is arranged in a lower position than the vehicle interior introduction port 4, via a communication duct 5.

The communication duct 5 includes a joint 5*a* connected to the vehicle interior introduction port 4, and a communication path 5*b* in communication with the joint 5*a*. The communication path 5*b* has a first end connected to the joint 5*a* and a second end connected to the electrostatic atomization device 7.

The joint 5*a* is formed by a metal pipe in the present embodiment. The joint 5*a* has a first end, which is fixed to the inside of the instrument panel 2 and connected to the vehicle interior introduction port 4, and a second end connected to the communication path 5*b*.

The communication path 5*b* is formed by a rubber hose in the present embodiment. The second end of the communication path 5*b* connected to the joint 5*a* is fastened to an emission port 9 of the electrostatic atomization device 7 by a connection fastener 10. Thus, charged micro-particle water of a nanometer size, which is generated by the electrostatic atomization device 7 and emitted from the emission port 9, is emitted from the vehicle interior introduction port 4 into the vehicle interior 1 via the communication duct 5 including the joint 5*a* and the communication path 5*b*.

Figure 3:
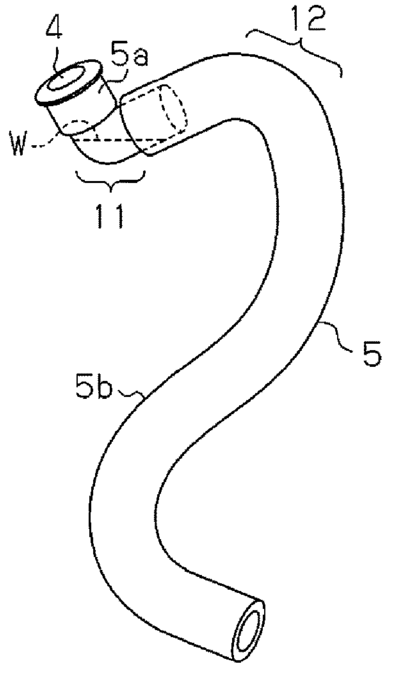
FIG. 3 is a diagram illustrating a communication duct.

As illustrated in FIG. 3, the joint 5*a* of the communication duct 5 includes a first curved portion 11 which is curved downward in a lower position than the vehicle interior introduction port 4. A distal end of the first curved portion 11 is connected to the first end of the communication path 5*b*. The communication path 5*b* of the communication duct 5 includes a second curved portion 12 which is curved upward in an upper position than the first curved portion 11 between the first curved portion 11 and the emission port 9.

That is, the communication duct 5, which has the joint 5*a* and the communication path 5*b*, includes the first curved portion 11 and the second curved portion 12. The second curved portion 12 formed on the side of the electrostatic atomization device 7 is positioned higher than the first curved portion 11 formed on the side of the vehicle interior introduction port 4.

In the present embodiment, although not illustrated, a holding member is used to maintain the shape of the second curved portion 12 because the flexible rubber hose is used for the communication path 5*b* of the communication duct 5.

There are cases where a liquid such as, for example, drinking water W enters the vehicle interior introduction port 4 in the instrument panel 2 by some chance. At this time, however, the drinking water W does not flow back to the electrostatic atomization device 7 over the second curved portion 12 because the first curved portion 11 arranged nearer to the vehicle interior introduction port 4 is positioned lower than the second curved portion 12 arranged nearer to the electrostatic atomization device 7. As a result, the drinking water W which has entered the vehicle interior introduction port 4 is temporarily held in the first curved portion 11 as illustrated in FIG. 3.

Figure 4:
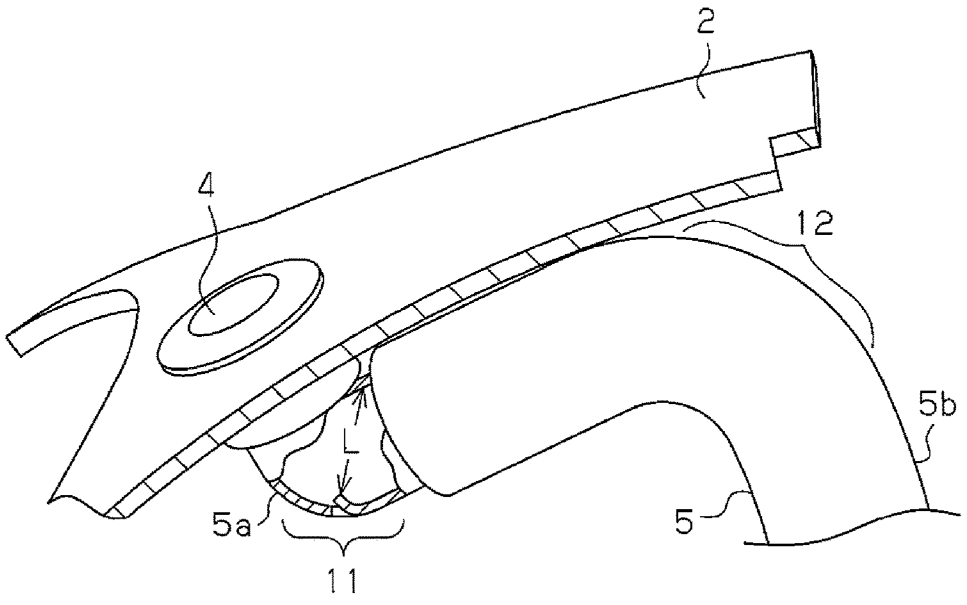
FIG. 4 is a diagram illustrating a drain hole formed in the communication duct.
Figure 5:
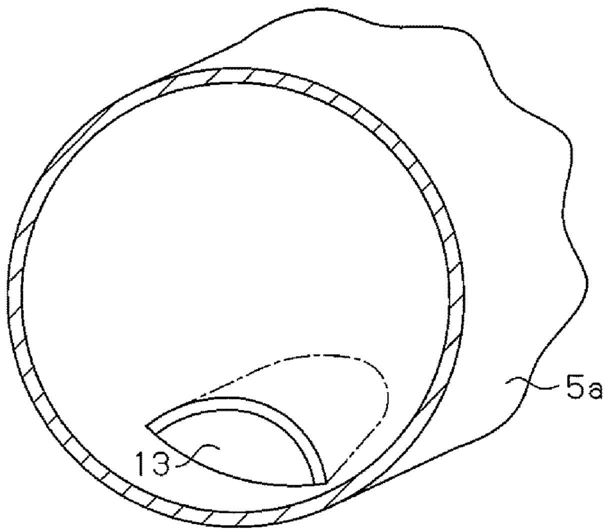
FIG. 5 is a diagram illustrating the shape of the drain hole.

Further, as illustrated in FIG. 4 and FIG. 5, the joint 5*a* of the communication duct 5 includes a drain hole 13 which is formed at a rise starting point (or the lowest position) of the first curved portion 11. The drain hole 13 is formed by partially cutting a lower outer surface, or a bottom surface, of the first curved portion 11, pressing a part of the bottom surface, which is on the downstream side of the first curved portion 11 in a direction in which the charged micro-particle water flows, into the underside of the bottom surface on the upstream side, and reducing an inner diameter L of the communication duct 5 on the upstream side. The drain hole 13 formed in the bottom surface of the first curved portion 11 allows drainage of the drinking water W, which has entered the vehicle interior introduction port 4, without holding it in the first curved portion 11.

Thus, the drinking water W, which has entered the first curved portion 11 via the vehicle interior introduction port 4, is drained from the drain hole 13. As a result, the drinking water W which has entered the vehicle interior introduction port 4 does not overflow from the first curved portion 11, nor flow into the electrostatic atomization device 7 by climbing over the second curved part 12. It is preferred that no device be arranged below the drain hole 13 because the drinking water W which has entered the vehicle interior introduction port 4 is drained from the drain hole 13.

Further, the drain hole 13 is formed by partially cutting the bottom surface of the first curved portion 11, pressing a part of the bottom surface, which is on the downstream side of the first curved part 11 in the direction in which the charged micro-particle water flows, into the underside of the bottom surface on the upstream side, and reducing the inner diameter L on the upstream side. Thus, an opening of the drain hole 13 does not face the direction in which the charged micro-particle water flows. As a result, the charged micro-particle water is hardly emitted from the drain hole 13. This suppresses reduction in the amount of charged micro-particle water that is emitted from the vehicle interior introduction port 4.

Furthermore, the communication duct 5 includes an inner surface that is formed to be smooth. Accordingly, flow path resistance in the communication duct 5 through which the charged micro-particle water passes is reduced. This suppresses the amount of emission of charged micro-particle water from being reduced due to a turbulent flow.

Besides, the first curved portion 11 and the second curved portion 12 are formed into curved shapes so as to form smooth curves. Accordingly, when the charged micro-particle water passes through the first and second curved portions 11 and 12, flow path resistance on inner surfaces thereof is reduced. As a result, generation of turbulent flow of charged micro-particle water in the first curved portion 11 and the second curved portion 12 is suppressed and thereby, reduction in the amount of emission of charged micro-particle water is suppressed.

In addition, the communication path 5*b* of the communication duct 5 is formed by a flexible rubber hose. Accordingly, the second curved portion 12 of a smoothly curved shape may be formed freely and easily without being restricted to the position of formation.

The electrostatic atomization device 7 will now be described.

Figure 6:
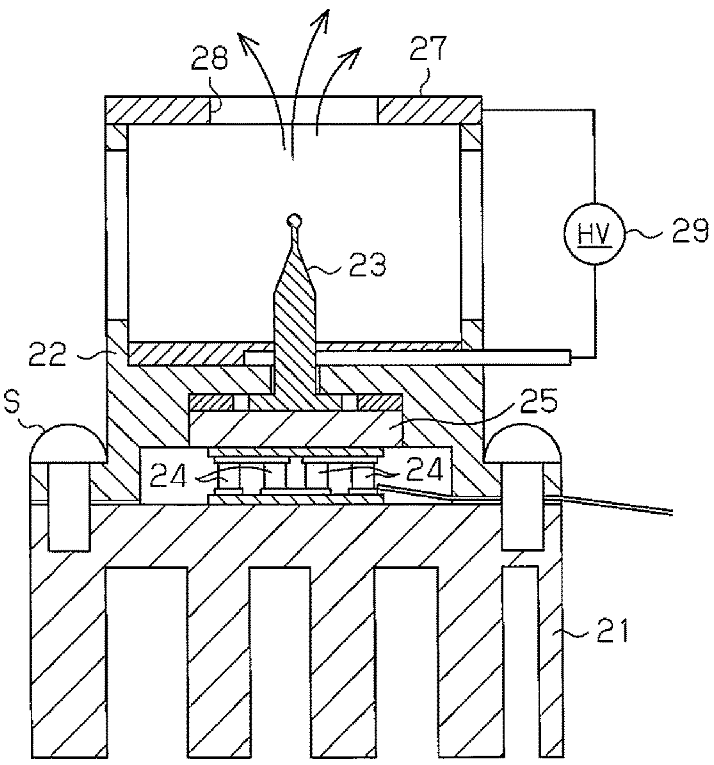
FIG. 6 is a schematic diagram illustrating an electrostatic atomization device.

FIG. 6 schematically illustrates the structure of the electrostatic atomization device 7. The electrostatic atomization device 7 includes a cylindrical bottomed housing 22 that is fixed to a heat radiation fin 21 by screws S. The heat radiation fin 21 is secured in a frame 20 (see FIG. 2) and made of aluminum. There is a space interposed between a bottom surface of the housing 22 and the heat radiation fin 21.

A discharge electrode 23, which forms a discharge unit, is arranged in the housing 22. The discharge electrode 23 includes a base portion, which is fixed to the bottom surface of the housing 22, and a distal end, which protrudes upward from the bottom surface of the housing 22 along the central axis line of the housing 22.

Peltier elements 24, which serve as cooling means, are attached to a lower surface of the base portion of the discharge electrode 23 via a cooling plate 25. The peltier elements 24 provide cooling effects to cool the discharge electrode 23 via the cooling plate 25. By cooling the discharge electrode 23, the moisture in the air is condensed at the distal end of the discharge electrode 23. That is, the cooling effects of the peltier elements 24 condense the moisture in the air to form condensed water. The condensed water is then supplied to the distal end of the discharge electrode 23.

A ground electrode 27, which serves as an opposing electrode, is arranged in an upper opening of the housing 22. The ground electrode 27 is a plate and includes a through hole 28 that is formed in the center position. The center of the through hole 28 of the ground electrode 27 is aligned with the central axis line of the housing 22.

A high voltage generator 29 applies high voltage to a space between the discharge electrode 23 and the ground electrode 27 in a manner that the discharge electrode 23 functions as a negative electrode. By applying the high voltage between the discharge electrode 23 and the ground electrode 27, the condensed water supplied to the distal end of the discharge element 23 is electrostatically atomized through Rayleigh fission. This generates charged micro-particle water of a nanometer size including active species as charged micro-particle liquid. Ozone is generated when the charged micro-particle water is generated.

The charged micro-particle water generated from the condensed water is guided to the emission port 9 positioned above via the through hole 28 of the ground electrode 27 along with ozone. The charged micro-particle water guided to the emission port 9 is emitted from the vehicle interior introduction port 4 to the vehicle interior 1 by passing through the communication duct 5.

The present embodiment has the advantages described below.

(1) The vehicle interior introduction port 4 arranged in the instrument panel 2 is connected to the electrostatic atomization device 7 installed in a lower position than the vehicle interior introduction port 4, and the communication duct 5 is arranged to guide the charged micro-particle water, which is generated by the electrostatic atomization device 7, to the vehicle interior introduction port 4.

The communication duct 5 includes the first curved portion 11 that is formed to be curved downward in an upper position (joint 5*a*) nearer to the vehicle interior introduction port 4. The communication duct 5 also includes the second curved portion 12 that is formed to be curved upward than the first curved portion 11 in a position (communication path 5*b*) between the first curved portion 11 and the emission port 9.

Accordingly, the first curved portion 11 curved downward, which is nearer to the vehicle interior introduction port 4, is positioned lower than the second curved portion 12 curved upward, which is nearer to the electrostatic atomization device 7. Therefore, even if a liquid such as the drinking water W enters the vehicle interior introduction port 4, the liquid does not flow into the electrostatic atomization device 7 over the second curved portion 12.

As a result, there is no backflow of a liquid to the electrostatic atomization device 7 through the communication duct 5 and thus, the electrostatic atomization device is prevented from being damaged.

(2) The drain hole 13 which penetrates through the inner bottom surface of the first curved portion 11 of the communication duct 5 is formed.

Accordingly, the drinking water W which has entered the first curved portion 11 via the vehicle interior introduction port 4 is drained immediately from the drain hole 13. Therefore, the drinking water W does not overflow from the first curved portion 11, nor flow into the electrostatic atomization device 7 by climbing over the second curved portion 12.

(3) The opening of the drain hole 13, which is formed in the first curved portion 11, does not face the direction in which the charged micro-particle water flows. Therefore, the charged micro-particle water is hardly emitted from the drain hole 13. Accordingly, reduction in the amount of charged micro-particle water to be emitted from the vehicle interior introduction port 4 is suppressed.

(4) The first and second curved portions 11 and 12 of the communication duct 5 are formed in a smoothly curved shape. Furthermore, the first and second curved portions 11 and 12 are formed to have a smooth internal surface. Accordingly, flow path resistance in the communication duct 5 through which the charged micro-particle water passes is reduced. This suppresses turbulent flow of the charged micro-particle water and suppresses reduction in the amount of charged micro-particle water to be emitted. Here, the smooth surface refers to a shape to prevent the turbulent flow and, in particular, refers to a surface shape with less unevenness. The inventors have discovered from experiment that a larger amount of charged micro-particle water is emitted from a tube, of which inner surface is smoother with no occurrence of turbulent flow, than a bellows tube.

(5) The charged micro-particle water generated by the electrostatic atomization device 7 is emitted to the vehicle interior 1 via the communication duct 5 and the vehicle interior introduction port 4 which are independently partitioned from the air flow path of the air conditioner and the air outlets 3 thereof.

Accordingly, the concentration of the charged micro-particle water emitted from the vehicle interior introduction port 4 to the vehicle interior 1 is not diluted by the air sent from the air conditioner.

The above embodiment may be modified as described below.

The above embodiment is provided with the smoothened inner surface of the communication duct 5 in order to decrease flow path resistance in the duct 5 through which the charged micro-particle water flows. As a method to smoothen the surface, for example, the communication duct 5 may be formed to have a smoothened inner surface with less unevenness by plasma treatment.

In the above embodiment, a flexible rubber hose is used for the communication path 5*b* of the communication duct 5 so as to easily form the second curved portion 12. However, the communication path 5*b* may also be formed by a thermoplastic resin which is molded by blow molding or other methods. In this case, the same advantages as the above embodiment may be obtained by forming the second curved portion 12 with a smooth curve.

In the above embodiment, although the communication duct 5 is formed by two members including the joint 5*a* and the communication path 5*b*, the communication duct 5 may be also formed by a single member. For example, the communication duct 5 may be formed by a flexible robber hose or formed by a thermoplastic resin which is molded by blow molding or other methods. Of course, the communication duct 5 may be formed by connecting three or more members.

In the above embodiment, although the communication duct 5 is connected to the emission port 9 of the electrostatic atomization device 7 by using the connection fastener 10, the connection fastener 10 may be omitted as long as the communication duct 5 is directly fixed to the emission port 9 of the electrostatic atomization device 7.

In the above embodiment, the first curved portion 11 and the second curved portion 12 are formed in the communication duct 5. In addition to this, a first new curved portion 11 and a second new curved portion 12 are further formed in a position more nearer to the electrostatic atomization device 7 than the second curved portion 12. This structure more appropriately prevents a liquid, which has entered the vehicle interior introduction port 4, from flowing back into the electrostatic atomization device 7.

In the above embodiment, the drain hole 13 is formed in the bottom surface of the first curved portion 11 by having the opening which does not face the direction in which the charged micro-particle water flows. Instead, a drain hole which simply penetrates through the bottom surface of the first curved portion 11 may be also employed.

The invention claimed is:

1. An electrostatic atomization system for a vehicle comprising:

an electrostatic atomization device that generates charged micro-particle water by applying a high voltage to a liquid supplied to a discharge unit, wherein the electrostatic atomization device includes an emission port for emitting the charged micro-particle water;

a vehicle interior introduction port arranged in an instrument panel in a vehicle interior and exposed to the vehicle interior, wherein the vehicle interior introduction port is partitioned from an air flow path of an air conditioner and is not in communication with an air outlet of the air conditioner; and a communication duct that includes two ends, wherein one of the two ends is connected to the emission port of the electrostatic atomization device and the other one of the two ends is fixed to the instrument panel and connected to the vehicle interior introduction port so that the charged micro-particle water generated by the electrostatic atomization device and flowing entirely through the communication duct is emitted from the vehicle interior introduction port toward the vehicle interior, wherein:

the electrostatic atomization device is located in a lower position than the vehicle interior introduction port in a vertical direction, the position causing a backflow of a liquid through the communication duct from the vehicle interior introduction port to the electrostatic atomization device, and the communication duct includes:

a first curved portion arranged between the emission port and the vehicle interior introduction port, wherein the first curved portion is maintained curved downward in a lower position than the vehicle interior introduction port in the vertical direction; and a second curved portion arranged between the first curved portion and the emission port, wherein the second curved portion is maintained curved upward in an upper position than the first curved portion in the vertical direction.

2. The electrostatic atomization system for a vehicle according to claim 1, wherein the communication duct further includes a drain hole formed in a lowest position of the first curved portion.

3. The electrostatic atomization system for a vehicle according to claim 2, wherein the drain hole is formed to reduce an inner diameter of the communication duct on an upstream side in a direction in which the charged micro-particle water flows.

4. The electrostatic atomization system for a vehicle according to claim 1, wherein the first and second curved portions are formed twice or more in the communication duct between the vehicle interior introduction port and the emission port.

5. The electrostatic atomization system for a vehicle according to claim 1, wherein the communication duct includes an inner surface formed in a smooth shape.

6. The electrostatic atomization system for a vehicle according to claim 1, wherein the communication duct includes a smooth inner surface.

* * * * *